May 16, 1961  J. R. SUITER  2,984,014
INSTRUMENTS FOR MEASURING THE CURVATURE OF CURVED SURFACES
Filed June 16, 1958

Inventor
J. R. Suiter

United States Patent Office 2,984,014
Patented May 16, 1961

2,984,014
INSTRUMENTS FOR MEASURING THE CURVATURE OF CURVED SURFACES
John Ross Suiter, Isleworth, England, assignor to C.A.V. Limited, London, England
Filed June 16, 1958, Ser. No. 742,174
Claims priority, application Great Britain June 20, 1957
1 Claim. (Cl. 33—178)

This invention has for its object to provide in a simple and convenient form, an instrument for measuring the curvature of a curved surface by a method in which the height of a segment is correlated with the length of its chord.

An instrument in accordance with the invention consists essentially of a rotatable and axially movable member, a stylus occupying an eccentric position on the said member, and means for measuring the axial displacement of the said member which occurs when the stylus is moved around a circular path in contact with the surface to be measured.

In a rudimentary form of the instrument there is provided a vertical spindle which is rotatably supported in any convenient bearing, and either the spindle, or the bearing is movable in the direction of the axis of the spindle. Also to the lower end of the spindle is attached an eccentrically placed stylus. When a body having a cylindrical surface is suitably placed beneath the spindle and in contact with the stylus, a half rotation of the spindle will be accompanied by a movement of the spindle in one direction during the first quarter of the revolution and an equal movement in the opposite direction during the second quarter of the rotation. Having given the radial distance of the stylus from the axis of the spindle, and having measured the axial displacement of the spindle, the radius of the surface of the body can be calculated from these two quantities.

In a practical embodiment of the instrument, there is provided a suitable support for the body to be measured, means for adjusting the support relatively to the spindle to obtain equal upward and downward movements of the spindle, and means for measuring the displacement of the spindle.

Figure 1:
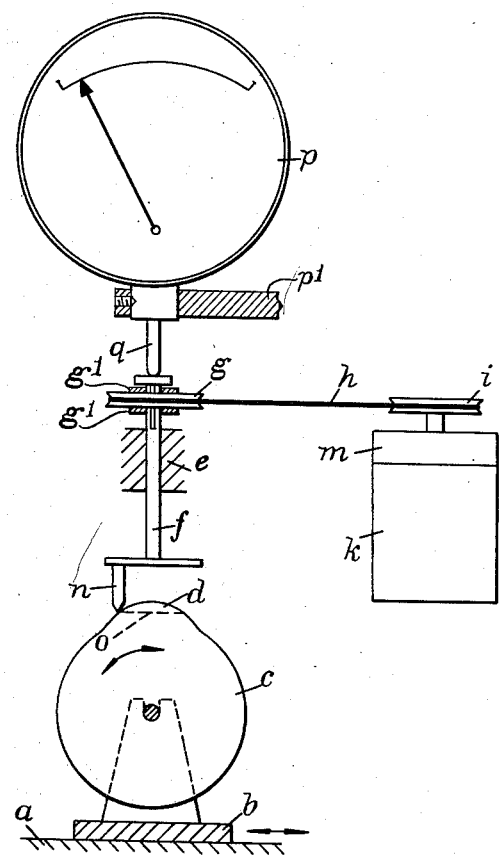
Figure 2:
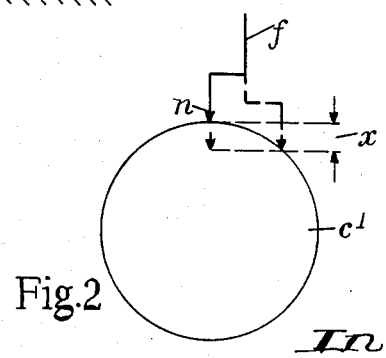

In the accompanying drawings Figure 1 illustrates diagrammatically an instrument for measuring the curvature of, for example, the crest of a lobe on a cam. Figure 2 illustrates a method of measuring the curvature of a spherical surface by means of the apparatus shown in Figure 1.

Referring to Figure 1 of the drawings, there is supported on a base $a$ a laterally adjustable work piece holder $b$, the work piece in this example consisting of a cam $c$ having thereon a lobe $d$. The instrument also includes a bearing $e$ which supports a vertical spindle $f$ having splined thereon a small pulley $g$ which is situated between a pair of fixed bearings $g^1$ and is driven by an endless cord $h$ from a pulley $i$ connected to a small electric motor $k$, the motion being transmitted through a reduction gear contained in a housing $m$, so as to rotate the spindle at the rate of, for example, about one revolution in four seconds. To the lower end of the spindle is rigidly secured a stylus $n$ which is eccentric to and parallel with the spindle axis, the radial distance of the stylus from the axis of the spindle being equal to one half of the length of the chord $o$ of the curved part of the work piece to be tested. At the upper end of the spindle there is mounted in a fixed support $p^1$ a micrometer $p$ of the conventional dial type, the movable member $q$ of which abuts on the upper end of the spindle.

The mode of use of the instrument is as follows:
After the work piece has been placed on the holder, the position of the work piece on the holder and the position of the latter on the base are each adjusted until the ends of the chord $o$ coincide exactly with the circular path of the stylus, thereby causing equal upward and downward movements to be imparted to the spindle during the rotation of the stylus, it being understood that the axial width of the work piece is always greater than the length of the chord $o$ so that the stylus when rotating is always in contact with the work piece. These adjustments may be made by hand, or by screw or other mechanisms. Having made the said adjustments, the deflection of the index finger is noted, the correct amount for an accurately shaped lobe having been previously ascertained by calculation. To assist the observer when examining a succession of nominally similar work pieces, an index mark corresponding to the correct deflection may be conspicuously marked on the dial of the micrometer.

The invention is not, however, restricted to the above example, as subordinate details of design or construction may be varied to suit different uses. For instance, the spindle of the stylus may be connected to the movable component of an electromagnetic current generating means, in which case the deflection of the index of a current measuring instrument serves to provide the desired measurement of curvature.

Further, instruments in accordance with the invention may be used for measuring both concave and convex surfaces. Moreover, the instrument may be used for measuring the curvature of surfaces other than cylindrical surfaces, including spherical surfaces. For measuring the curvature of a spherical work piece $cl$ as shown in Figure 2, the workpiece is adjusted so that the stylus $n$ initially contacts the work piece at a position coincident with the upper end of a vertical diameter of the work piece. On rotating the stylus through 180° the stylus and its spindle $f$, fall through a vertical distance $x$ as indicated by the dotted lines. The measurement of the distance $x$ is given by the micrometer gauge $p$ and the radius of the path of the stylus being known, the radius of the workpiece can be obtained by calculation. For a given radius of the said path the gauge can be calibrated to give a direct reading of the radius of the workpiece.

Having thus described my invention, what I claim as new and desire to secure by Letters Patent is:

An instrument for measuring the curvature of a curved surface on a work piece, comprising in combination a rotatable and axially movable spindle, driving means connected to said spindle for imparting rotary motion thereto, a stylus rigidly secured to said spindle in a position eccentric to and parallel with the axis thereof so that rotation of said spindle causes said stylus to traverse a circular path having a diameter equal to a chord of the curved surface to be measured, means for supporting the work piece in a position in which said stylus, while traversing its circular path in response to rotation of said spindle, remains in constant contact with the curved surface to be measured so that said stylus and spindle receive axial movement dependent on the curvature of said surface, and an indicating device of the dial type having an actuating member responsive to axial movement of said spindle.

References Cited in the file of this patent

UNITED STATES PATENTS

| | | |
|---|---|---|
| 1,241,469 | Payne | Sept. 25, 1917 |
| 1,823,719 | Baker | Sept. 15, 1931 |
| 2,179,602 | Smith | Nov. 14, 1939 |
| 2,665,492 | Freimark | Jan. 12, 1954 |
| 2,785,474 | Mages et al. | Mar. 19, 1957 |